3b EQUIVALENT TRANSMISSION LINES

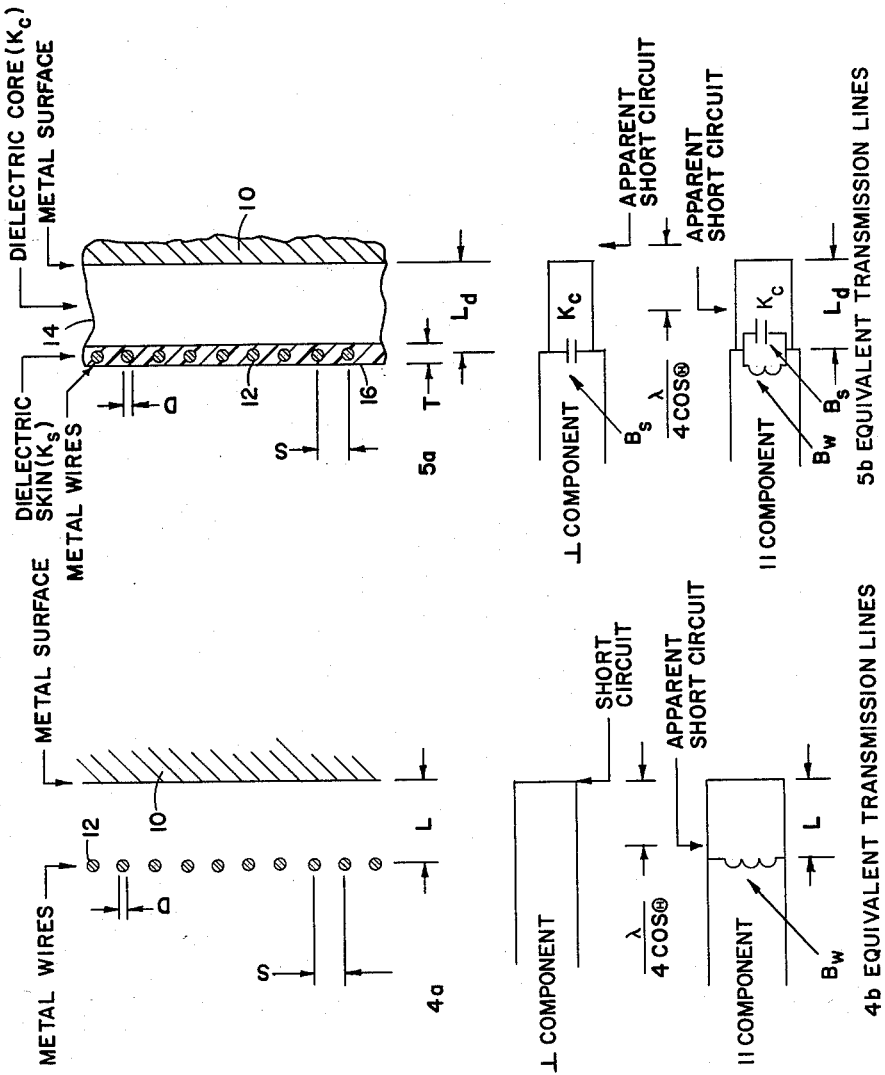

United States Patent Office 3,161,879
Patented Dec. 15, 1964

3,161,879
TWISTREFLECTOR
Peter W. Hannan, Great Neck, and Henry Jasik, Flushing, N.Y., and Kenneth B. Woodard, Basking Ridge, N.J., assignors, by mesne assignments, to the United States of America as represented by the Secretary of the Army
Filed Jan. 5, 1961, Ser. No. 80,961
1 Claim. (Cl. 343—18)

This invention relates to means for reflecting electromagnetic waves and particularly to a reflector which both reflects and twists the polarization of an incident wave by 90°.

It is the object of the invention to provide a reflector which combines the properties of reflection and 90° rotation of polarization while offering both a wideband and a wideangle performance.

In accordance with the invention a reflector, or twistreflector as it will hereinafter be termed, is constructed using a completely reflecting metal sheet and a series of conducting parallel wire elements positioned in front of the reflecting sheet and aligned at 45° to the polarization of an incident linear polarized wave. For air spacing between the metal sheet and wire elements the spacing is in the midrange between one fourth and one half guide-wavelengths, wavelengths in an equivalent transmission line which is greater than free space wavelength by the factor $1/\cos\Theta$, where $\Theta$ is the angle of incidence. By the term midrange it is intended to exclude spacing which is substantially one-quarter or one-half wavelength. The spacing may also vary by added multiples of one-half guide-wavelengths. The wire diameter is made substantially smaller than wire-to-wire spacing and the wire-to-wire spacing small compared to the wavelength of energy to be reflected.

The structure and operation of apparatus embodying the principles of the present invention will be more clearly understood from a consideration of the following description and appended drawings in which:

FIGURE 4 shows a modification of FIGURE 3 adapted for wider frequency and wider angle operation; and FIGURE 5 shows a modification of the embodiment of the invention shown in FIGURE 4 in which the wire elements are supported by a dielectric.

Figure 1:
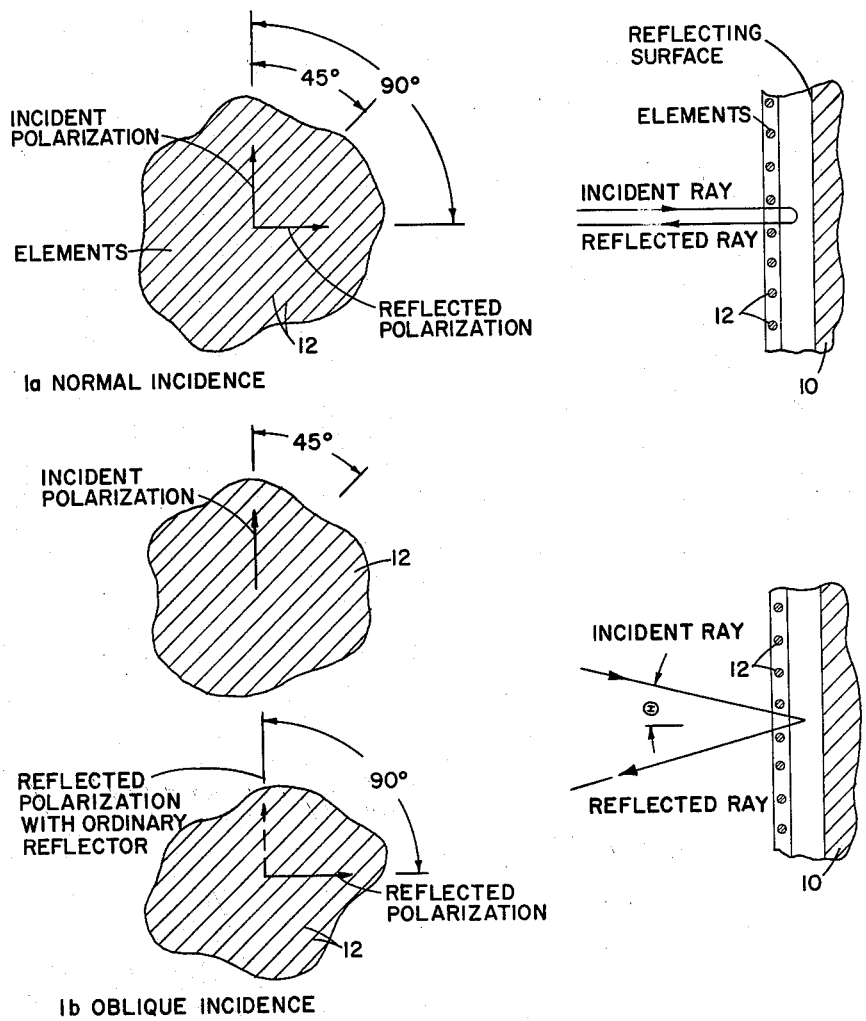
FIGURE 1 shows a cross-section view of a portion of a basic embodiment of the invention and the geometry of operation.

Referring now to FIGURE 1, the twistreflector comprises a metal completely reflecting sheet 10 behind a series of parallel metal elements 12 aligned at 45° to the polarization of an incident linear polarized electromagnetic wave. The elements are such that the component of the wave which is polarized parallel to the wires is shifted a half wave in phase relative to the component polarized perpendicular to the wires. This results in the polarization of the reflected wave being twisted by 90°, as is explained below.

The basic geometry of the twistreflector action is also shown in FIGURE 1. The case of normal incidence is given in FIGURE 1(a). If the incident polarization is at 45° to the elements, as shown, then an ideal twistreflector yields a cross-polarized reflected wave. In the case of oblique incidence, shown in FIGURE 1(b), the pertinent incident polarization should be at 45° to the projection of the elements on the incident wavefront (plane perpendicular to the incident ray). If this condition is satisfied, then, as shown, an ideal twistreflector yields a reflected wave whose polarization is twisted 90° from that which would be obtained with a simple reflecting (metal) sheet.

Figure 2:
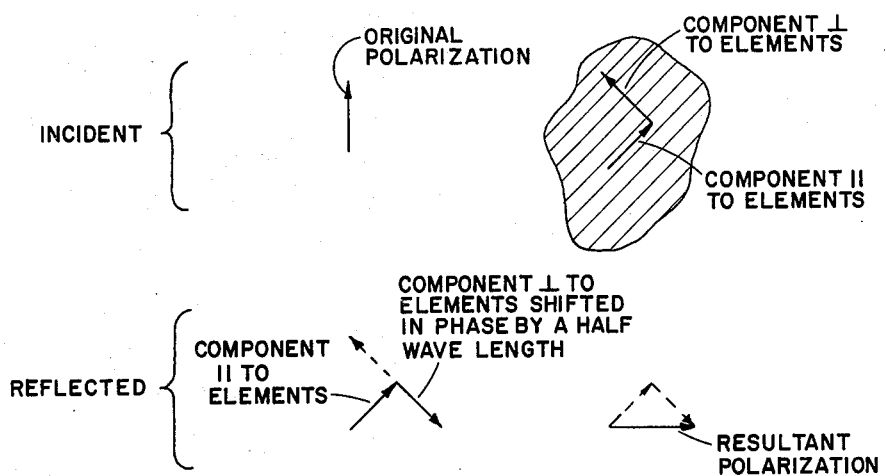
FIGURE 2 is a vector diagram illustrating the general operation of the invention.

The mechanism by which the wave is twisted in an ideal twistreflector is illustrated in FIGURE 2. The incident wave may be resolved into two components: one having polarization parallel to the projection of the elements, and the other having polarization perpendicular to the projection of the elements. These two components are equal in magnitude because the incident polarization is specified as being at 45° to the projection of the elements, as discussed above. After reflection from the twistreflector, these two components are unchanged in magnitude, but the phase of one has been shifted a half wavelength relative to the other by the elements. As shown, the resultant of these two components is a wave equal in magnitude to the incident one, but whose polarization is twisted by 90°.

The essential property of the elements is the half-wavelength phase shift of one component relative to the other. Elements or materials which are anisotropic are capable of achieving this. Some possible elements include metal or dielectric strips, wires, dipoles and slots.

A twistreflector may be made of a metal surface and metal wires involving wires which completely reflect the component polarized parallel to their projection and completely transmitting the perpendicular component. This situation may be approached by making the wire spacing very small compared to a wavelength, and the wire diameter much less than the spacing. In order to shift the phase of the parallel component by a half wavelength relative to the perpendicular component, the wires are located a quarter wavelength ahead of the metal surface.

Figure 3:
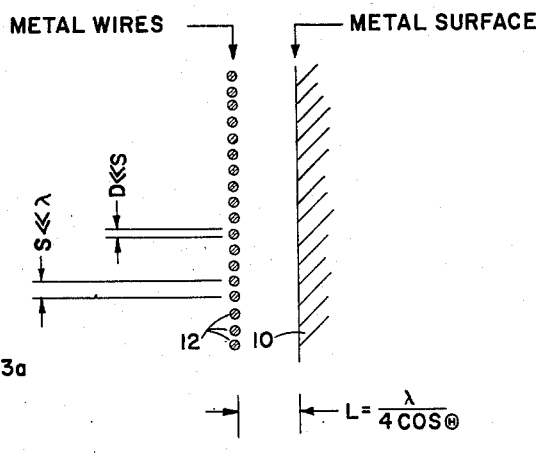
FIGURE 3 shows a cross-section of a rudimentary embodiment of the invention together with equivalent electrical circuits.
Figure 3:
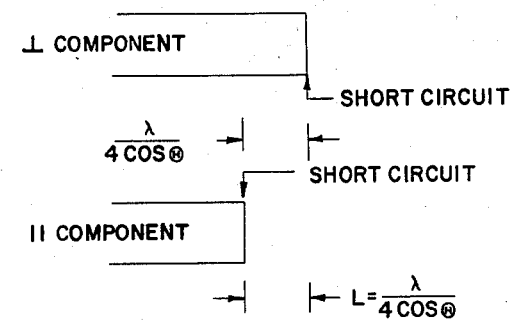

The cross-section of this design is drawn in FIGURE 3. Also shown are the equivalent transmission lines for the two components. The transmission line for the perpendicular component is short-circuited by the metal surface, while the transmission line for the parallel component is short-circuited by the wires a quarter wavelength ahead. Thus the wave reflected from these short circuits has a half wavelength further to travel in the case of perpendicular polarization than it does for parallel polarization.

It may be noted in FIGURE 3 that the dimensions are given in terms of wavelength divided by $\cos\Theta$. This is because a wave incident at an oblique angle has an effective wavelength in the equivalent transmission lines (guide wavelength) which is greater than the free-space wavelength by the factor $1/\cos\Theta$. Thus, if the twistreflector is intended to operate at oblique incidence, the distance from the wires to the metal surface should be $\lambda/4\cos\Theta$, in order that the two reflected components be a half guide-wavelength out of phase.

The simple design just described performs perfectly at the frequency and angle of incidence for which it is designed. However, it is apparent that at another frequency or incidence angle the wire layer is no longer a quarter guide-wavelength from the metal surface. This will result in the reflected wave having a component which is not twisted 90°. It will be shown however how a modification of the twistreflector enables it to achieve nearly perfect twisting over a range of frequency and angle of incidence.

The twistreflector described above achieves the desired half-wavelength phase shift between the two components by having actual short circuits for the two components which are a quarter wavelength apart. The short circuit for the parallel component is obtained by close spacing of the wires. However, it has been found that the short circuit effect may be obtained with less closely spaced wires which do not completely reflect the parallel component. In this case, the metal surface reflects that part of the parallel component not reflected by the wires, in addition to reflecting all of the perpendicular component. The wires must be located more than a quarter wavelength away from the metal surface in order that the effective short circuit for the parallel component be still a quarter wavelength away. To illustrate the effective or apparent short circuit, reference is made to FIGURE 4. Also shown are the equivalent transmission lines for the two components. The wires are seen to introduce inductive (negative) susceptance across the transmission line for the parallel component. The value of this susceptance is given by the following approximate formula:

$$\frac{B_w}{Y_0} \simeq -\frac{\lambda}{S \cos \Theta} \frac{1}{\ln\left(\frac{S}{\pi D}\right)} \quad (1)$$

$B_w$ = susceptance of the wires.
$Y_0$ = admittance of free space.
$\lambda$ = wavelength in free space.
$S$ = spacing between wire centerlines.
$\Theta$ = angle of incidence.
$D$ = diameter of wires.

This formula is a good approximation when the spacing between wires is small compared with a wavelength, and when the wire diameter is small compared with the spacing between wires.

It is desired that the apparent short circuits for the two components be a quarter wavelength apart. An equivalent criterion requires that the input admittance at any reference plane in one transmission line be the reciprocal of that at the same plane in the other line or:

$$Y' = \frac{1}{Y''} \quad (2)$$

$Y'$ = input admittance for component whose electric field is perpendicular to the wires.
$Y''$ = input admittance for component whose electric field is parallel to the wires.

By standard transmission-line analysis, the input admittance of the two lines at a reference plane through the wires is:

$$\frac{Y'}{Y_0} = -j \ \text{ctn} \left(\frac{2\pi L \cos \Theta}{\lambda}\right) \quad (3)$$

$L$ = distance from metal surface to wire centerline in the all-metal design.

$$\frac{Y''}{Y_0} = -j \ \text{ctn} \left(\frac{2\pi L \cos \Theta}{\lambda}\right) + j\frac{B_w}{Y_0} \quad (4)$$

Substituting (3) and (4) in (2), and solving for $B_w/Y_0$, yields the following formula:

$$\frac{B_w}{Y_0} = 2 \ \text{csc} \left(\frac{4\pi L \cos \Theta}{\lambda}\right) \quad (5)$$

If this relationship is satisfied, then the twistreflector performs as intended. It can be seen that the susceptance $B_w/Y_0$ may take any value from infinity to 2. For negative susceptance, corresponding to inductive wires, the distance from the wires to the metal surface may be any value between one-quarter guide-wavelength and one-half guide-wavelength. (If the elements had positive susceptance, i.e, were capacitive, the distance would be between zero and one-quarter guide-wavelength. However, such elements cannot be made from metal wires; thin dielectric wires would be required.)

Both the quarter and the half guide-wavelength distances for the inductive case correspond to a value of minus infinity for $B_w/Y_0$, and require very closely spaced wires. The quarter guide-wavelength case is the simple design illustrated in FIGURE 3, while the half guide-wavelength case is a resonant one, and consequently yields extremely narrow-band and narrow-angle performance. A distance of three-eighths guide-wavelength corresponds to the smallest possible magnitude of $B_w/Y_0$; the value at this point is $B_w/Y_0 = -2$. This design yields the greatest allowable spacing between wires, as may be seen from Formula 1. It should be mentioned that other ranges of greater distances are also possible (greater by one-half guide-wavelength), but it is usually desirable to choose the small one in order to obtain minimum size and best performance.

Substituting the expression for the susceptance of the wires (1) into (5) yields the single formula which determines the relationship between the various dimensions and the characteristics of the incident wave for perfect operation of the general twistreflector:

$$2 \ \text{csc} \left(\frac{4\pi L \cos \Theta}{\lambda} - \pi\right) \simeq \frac{\lambda}{S \cos \Theta} \frac{1}{\ln\left(\frac{S}{\pi D}\right)} \quad (6)$$

For any specified values of frequency and angle of incidence, a range of values for L, S and D are allowable, with any two then determining the third.

As indicated above it is desired to obtain a twistreflector which performs well over a range of values of the frequency and the angle of incidence. We will define an optimum performance the condition whereby a first-order small change of frequency or incidence angle causes a departure from perfect polarization twisting of only second-order smallness. This, it has been found, may be determined by differentiating Formula 6 with respect to $\lambda$ and $\Theta$. In both cases, this gives the following relationship:

$$\frac{4\pi L \cos \Theta}{\lambda} = \tan \left(\frac{4\pi L \cos \Theta}{\lambda}\right) \quad (7)$$

All the solutions of this equation which yield inductive (negative) susceptance in Formula 5 yield an optimum design. However, the lowest order solution is the best because the twistreflector performance remains good over the widest range of frequency and incidence angle. This solution is:

$$\frac{L \cos \Theta}{\lambda} = .358 \ \text{or} \ L = \frac{.358\lambda}{\cos \Theta} \quad (8)$$

Thus in the optimum design, the distance from the wires to the metal surface is directly determined by the frequency and angle of the incident wave. It should be noted that, since Equation 7 was obtained in both cases, the resulting single optimum design is *simultaneously* optimum for both frequency changes and changes of angle of incidence. Values approximating the optimum solution will of course provide acceptable results.

Substituting the value in Formula 8 into Formula 5 yields:

$$\frac{B_w}{Y_0} = -2.05 \quad (9)$$

This inductive susceptance is close to the minimum possible value (−2.00) noted in the previous section. Therefore the optimum design has a number of wires which is close to the minimum possible.

Substituting the value in Formula 9 into Formula 1 yields:

$$\frac{\lambda}{S \cos \Theta} \frac{1}{\ln\left(\frac{S}{\pi D}\right)} \simeq 2.05 \quad (10)$$

This formula, together with Formula 8, determines the dimensions of the optimum design in terms of the frequency and angle of the incident wave. When frequency and angle of incidence are expected to vary over a range, the values applied in both formulas should be approximately the average ones. In the case of angle of incidence, the averaging should be applied to $\cos \Theta$ rather than $\Theta$.

It may be seen in Formula 10 that wire spacing and diameter are still not explicitly determined. For instance, as wire spacing is increased, the diameter can be increased in such a way as to maintain the equality given by Formula 10. The only limit on this process is that the wire spacing be not too large a fraction of a wavelength, in order that Formula 1 for wire susceptance be a good approximation, and to preclude the possibility of a coherent set of diffracted waves. If the spacing between wires is kept less than a quarter wavelength, the formulas are accurate enough for most purposes, and diffracted waves are far from existence. Within this limitation, and the relationship imposed by Formula 10, the wire screen dimensions may be chosen for constructional convenience. This is also true for the general design, as seen in Formula 6.

The twistreflector designs so far described are constructed of round metal wires and metal sheet: both materials are readily obtainable. However, for many if not all practical applications suitable means of supporting the wires must be determined. As a feature of this invention a dielectric material of very low dielectric constant (K) is used to fill most of the space between the metal surface and the wires, and a very thin dielectric sheet used to house the wires. Referring now to FIGURE 5, the first material is the core 14 and the second is the skin 16. It will be shown how the dimensions of the all-metal designs so far described should be modified when the dielectric material is added.

The effect of the low-K (dielectric constant) core is to decrease the wavelength and impedance in that part of the structure, as indicated in the transmisison-line diagrams in FIGURE 5. To compensate for this, and thus maintain the same electrical distance, the actual distance from the wires to the metal surface must be changed. The change which compensates for the shortened wavelength is approximately:

$$\Delta L \simeq -\frac{L(K_c - 1)}{2 \cos^2 \Theta} \quad (11)$$

The change which compensates for the lower impedance is approximately:

$$\Delta L \simeq \frac{\lambda(K_c - 1)}{8\pi \cos^3 \Theta} \sin\left(\frac{4\pi L \cos \Theta}{\lambda}\right) \quad (12)$$

$K_c$ = dielectric constant of core.

A positive value means that the distance must be increased, and a negative one requires a decrease. Strictly speaking, Formula 12 is valid only at normal incidence. However, for a small departure from normal incidence, the value given by this formula is approximately the average of the actual values for E-plane and H-plane oblique incidence. Therefore if incidence in both planes is expected, and if the incidence angle is not too great, this formula yields approximately the best average value. Both formulas are close approximations when the core has a very low K.

The principal effect of the thin dielectric skin is to introduce capacitive susceptance, as indicated in the transmission-line diagrams in FIGURE 5. For skin thicknesses much smaller than a wavelength, this susceptance is given by the following approximate formula:

$$\frac{B_s}{Y_0} \simeq \frac{2\pi T(K_s - 1)}{\lambda} \quad (13)$$

$B_s$ = susceptance of the dielectric skin.
$K_s$ = dielectric constant of skin.
$T$ = thickness of dielectric skin.

Strictly speaking, Formula 13 is valid only at normal incidence. However, as is the case for Formula 12, it yields approximately the best average value for E-plane and H-plane oblique incidence. The modification to the design which compensates for a capacitive susceptance at the plane of the wires is a decrease of the distance from the wires to the metal surface. If the susceptance is small, this new distance may be computed from the following approximate formula:

$$\Delta L \simeq -\frac{B_s}{Y_0} \frac{\lambda}{2\pi \cos \Theta} \sin^2\left(\frac{2\pi L \cos \Theta}{\lambda}\right) \quad (14)$$

Combining Formulas 11, 12, 13 and 14, yields the new distance required when the core and skin are added:

$$L_d \simeq L - \frac{L(K_c - 1)}{2 \cos^2 \Theta} + \frac{\lambda(K_c - 1)}{8\pi \cos^3 \Theta} \sin\left(\frac{4\pi L \cos \Theta}{\lambda}\right) - \frac{T(K_s - 1)}{\cos \Theta} \sin^2\left(\frac{2\pi L \cos \Theta}{\lambda}\right) \quad (15)$$

$L_d$ = distance from metal surface to wire and skin centerline in the design having a supporting dielectric core and skin.

Under the conditions mentioned above, this new distance in the composite structure yields performance closest to an all-metal structure having a distance L. An optimum value for L may be obtained from the relation ($L \cos \Theta = .358\lambda$) from Equation 8.

It should be appreciated that the design is not limited to wires of circular cross-section; any shape having the same inductive susceptance will do. One alternate construction might utilize printed-circuit techniques to produce wires on the dielectric skin.

The basic property of the twistreflector is to twist a linearly polarized wave by 90°. This occurs when the projections of the elements are at 45° to the incident polarization. However, if the elements are at some other angle, then the polarization is twisted by a different amount; the polarization twist is actually equal to twice the angle between the element projections and the incident polarization. Hence, if the twistreflector is rotated, the polarization of the reflected wave will rotate at twice the speed (at normal incidence).

When a twistreflector is placed in front of an incident circularly-polarized wave, the reflected wave is circularly polarized too. This is also the case with an ordinary reflector. However, an ordinary reflector reverses the rotational sense of the circular polarization, while the twistreflector does not. This remains true even as the twistreflector is rotated.

The principal object of the present invention is to provide a twistreflector intended to twist the polarization of a linearly polarized wave; this is accomplished by a half-wavelength phase shift between two reflected polarizations. If however, a quarter-wavelength phase shift were employed, this would yield a device for changing linear polarization to circular polarization or vice versa; such a design might be called a "changereflector."

The following invention is claimed:

A twistreflector for electromagnetic radiation of a wavelength $\lambda$ comprising a plane metal sheet; a plurality of wires embedded in a thin dielectric sheet and lying in a plane parallel to said metal sheet; and a dielectirc material of very low dielectric constant substantially filling the space between said plane and said sheet, the diameter of said wire being substantially smaller than the wire to wire spacing, the wire to wire spacing being small with respect to $\lambda$, and the distance between said plane and said sheet being approximately equal to $$L - \frac{L(K_c - 1)}{2 \cos^2 \Theta} + \frac{\lambda(K_c - 1)}{8\pi \cos^3 \Theta} \sin\frac{(4\pi L \cos \Theta)}{\lambda} - \frac{T(K_s - 1)}{\cos \Theta} \sin^2\frac{(2\pi L \cos \Theta)}{\lambda}$$

where $\lambda$ is the wavelength in free space, L is the distance from metal surface to wire centerline in the general all-metal design having a value of $$\frac{0.358}{\cos \Theta}\lambda$$

in the optimum all-metal design, T is the dielectric skin thickness, $K_c$ is the dielectric constant of the core, $K_s$ is the skin dielectric constant, and Θ is the angle of incidence of said radiation.

References Cited by the Examiner

UNITED STATES PATENTS

| 2,522,562 | 9/50 | Blitz | 343—912 X |
| 2,554,936 | 5/51 | Burtner | 343—756 |
| 2,930,039 | 3/60 | Ruze | 343—756 |
| 2,942,266 | 6/60 | Mattingly | 343—756 X |

FOREIGN PATENTS 668,231  11/38  Germany.

CHESTER L. JUSTUS, *Primary Examiner.*